United States Patent
Akiyama et al.

(10) Patent No.: US 10,371,589 B2
(45) Date of Patent: Aug. 6, 2019

(54) CONTROL DEVICE FOR DYNAMOMETER SYSTEM

(71) Applicant: MEIDENSHA CORPORATION, Tokyo (JP)

(72) Inventors: Takao Akiyama, Tokyo (JP); Nobuhiko Asakura, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 15/544,492

(22) PCT Filed: Jan. 8, 2016

(86) PCT No.: PCT/JP2016/050519
§ 371 (c)(1),
(2) Date: Jul. 18, 2017

(87) PCT Pub. No.: WO2016/117394
PCT Pub. Date: Jul. 28, 2016

(65) Prior Publication Data
US 2017/0350775 A1    Dec. 7, 2017

(30) Foreign Application Priority Data

Jan. 19, 2015   (JP) .................. 2015-007752

(51) Int. Cl.
*G01L 3/04*     (2006.01)
*G01M 15/04*    (2006.01)
(Continued)

(52) U.S. Cl.
CPC .............. *G01L 3/04* (2013.01); *G01L 3/242* (2013.01); *G01L 25/006* (2013.01); *G01M 15/04* (2013.01)

(58) Field of Classification Search
None
See application file for complete search history.

(56) References Cited

U.S. PATENT DOCUMENTS 3,324,363 A * 6/1967 Hill ................ G05D 15/01
                                              318/6

4,520,681 A * 6/1985 Moore ............... G01L 3/242
                                              73/862.28
(Continued)

FOREIGN PATENT DOCUMENTS

JP     2002337711 A  * 11/2002
JP     2003009566 A  *  1/2003 ............ G05D 19/02
(Continued)

OTHER PUBLICATIONS

Machine Translation for JP2002337711A.*
(Continued)

*Primary Examiner* — Janet L Suglo
*Assistant Examiner* — Leonard S Liang
(74) *Attorney, Agent, or Firm* — Muncy, Geissler, Olds & Lowe, P.C.

(57) ABSTRACT

The purpose of the present invention is to provide a control device for a dynamometer system, with which, by a simple method, an unloaded state can be reproduced highly accurately when a test piece is started. A dynamo control device 6 is provided with: an integral control input computation unit 611 for computing the integral value of axle torque deviation, and multiplying the sum thereof and a correction value by an integral gain to compute an integral control input; a correction value computation unit 612 for multiplying an inertia compensation quantity Jcmp by the dynamo rotation frequency to compute a correction value; a non-integral control input computation unit 613 for designating, as a non-integral control input, the output of a prescribed transmission function Ge0(s) having axle torque deviation as input; and a totaling unit 614 for totaling the integral control input and the non-integral control input in order to generate a torque current command signal to the dynamometer. The transmission function Ge0(s) of the non-integral control input computation unit 613 is derived by separating the integrator from a transmission function Ge(s) having an axle torque control function, in such a way as to satisfy the relational equation (Ge(s)=Ki/s+Ge0(s)).

2 Claims, 4 Drawing Sheets

(51) Int. Cl.
*G01L 25/00* (2006.01)
*G01L 3/24* (2006.01)

(56) References Cited

U.S. PATENT DOCUMENTS

| | | | | |
|---|---|---|---|---|
| 4,656,576 | A * | 4/1987 | Kawarabayashi | ............................ G01M 17/0072 700/28 |
| 4,745,799 | A * | 5/1988 | Kawarabayashi | ............................ G01M 17/0072 73/116.06 |
| 4,870,585 | A * | 9/1989 | Manzolini | ............ G01M 15/044 701/101 |
| 4,995,139 | A * | 2/1991 | Suzuki | ................ G01M 15/044 73/116.05 |
| 5,428,285 | A * | 6/1995 | Koyama | ................ G05B 17/02 318/560 |
| 5,729,111 | A * | 3/1998 | Ogura | .................... G05D 19/02 318/432 |
| 6,434,454 | B1 * | 8/2002 | Suzuki | .................. G01M 15/02 701/32.9 |
| 6,566,837 | B1 * | 5/2003 | Zhang | .................... G05B 19/19 318/610 |
| 6,768,940 | B2 * | 7/2004 | Akiyama | ............ G01M 15/044 701/114 |
| 6,775,610 | B2 * | 8/2004 | Akiyama | ............ G01M 15/044 701/110 |
| 8,770,019 | B2 * | 7/2014 | Grunbacher | .......... G01M 15/05 73/116.05 |
| 9,116,062 | B2 * | 8/2015 | Akiyama | ................... G01L 3/24 |
| 9,164,005 | B2 * | 10/2015 | Takahashi | ................. H02P 6/06 |
| 9,255,856 | B2 * | 2/2016 | Takahashi | ................. G01L 5/24 |
| 9,400,231 | B2 * | 7/2016 | Akiyama | ................... G01M 15/04 |
| 9,459,181 | B2 * | 10/2016 | Akiyama | ................... G01M 13/025 |
| 2003/0052639 | A1 * | 3/2003 | Tanaka | ................. B62D 5/0463 318/632 |
| 2003/0083793 | A1 * | 5/2003 | Akiyama | ............ G01M 15/044 701/114 |
| 2003/0088345 | A1 * | 5/2003 | Akiyama | ............ G01M 15/044 701/32.8 |
| 2006/0106526 | A1 * | 5/2006 | Sugita | ................. G01M 15/044 701/114 |
| 2008/0114515 | A1 * | 5/2008 | Hara | .................... B62D 5/0466 701/42 |
| 2009/0058346 | A1 * | 3/2009 | Marushita | .............. G05D 19/02 318/611 |
| 2009/0251092 | A1 * | 10/2009 | Zhang | .................... G05B 11/42 318/609 |
| 2010/0251811 | A1 * | 10/2010 | Akiyama | .............. G01M 15/02 73/116.05 |
| 2012/0239198 | A1 * | 9/2012 | Orita | ..................... B25J 9/1641 700/260 |
| 2015/0008861 | A1 * | 1/2015 | Sonoda | ................. G05B 13/04 318/504 |
| 2015/0039246 | A1 * | 2/2015 | Takahashi | ................ G01L 5/24 702/41 |
| 2015/0101421 | A1 * | 4/2015 | Takahashi | ................. H02P 6/06 73/862.325 |
| 2016/0084735 | A1 | 3/2016 | Akiyama et al. | |
| 2016/0252428 | A1 * | 9/2016 | Akiyama | .............. G01M 15/02 73/116.05 |
| 2017/0350775 | A1 * | 12/2017 | Akiyama | .............. G01M 15/04 |
| 2018/0003589 | A1 * | 1/2018 | Akiyama | .............. G01M 15/04 |
| 2018/0031448 | A1 * | 2/2018 | Sugita | ................. G01M 15/042 |
| 2018/0372586 | A1 * | 12/2018 | Ogawa | ................ G01M 15/044 |

FOREIGN PATENT DOCUMENTS

| | | | | |
|---|---|---|---|---|
| JP | 2003-149085 | | 5/2003 | |
| JP | 2003149085 | A * | 5/2003 | .......... G01M 15/044 |
| JP | 2004361255 | A * | 12/2004 | |
| JP | 2006172149 | A * | 6/2006 | .......... G05B 19/404 |
| JP | 2006242593 | A * | 9/2006 | |
| JP | 2006300682 | A * | 11/2006 | |
| JP | 2008286614 | A * | 11/2008 | |
| JP | 2009002714 | A * | 1/2009 | |
| JP | 2010223861 | A * | 10/2010 | |
| JP | 2012068199 | A * | 4/2012 | |
| JP | 2012088188 | A * | 5/2012 | |
| JP | WO 2012057235 | A1 * | 5/2012 | .......... G05B 19/416 |
| JP | 2013-053977 | | 3/2013 | |
| JP | 2013-053978 | | 3/2013 | |
| JP | 2013053910 | A * | 3/2013 | |
| JP | 2013053977 | A * | 3/2013 | |
| JP | 2013053978 | A * | 3/2013 | |
| JP | 2013181904 | A * | 9/2013 | ............... G01L 5/24 |
| JP | WO 2013129533 | A1 * | 9/2013 | ............... G01L 5/24 |
| JP | 5605127 | | 9/2014 | |
| JP | 2014-224722 | | 12/2014 | |
| JP | 2014224722 | A * | 12/2014 | .......... G01M 15/04 |
| JP | WO 2014199688 | A1 * | 12/2014 | .......... B66B 13/143 |
| JP | 2017198605 | A * | 11/2017 | .......... G01M 15/02 |

OTHER PUBLICATIONS

EIC 2800 Database Search Report (Conducted Oct. 11, 2017) (Year: 2017).*
Wikipedia Entry for PID controller (Wayback Machine Capture from Jan. 14, 2015) (Year: 2015).*
Machine Translation for JP2003009566 (Year: 2003).*
Machine Translation for JP2003149085 (Year: 2003).*
Machine Translation for JP2004361255 (Year: 2004).*
Machine Translation for JP2006172149 (Year: 2006).*
Machine Translation for JP2006242593 (Year: 2006).*
Machine Translation for JP2006300682 (Year: 2006).*
Machine Translation for JP2008286614 (Year: 2008).*
Machine Translation for JP2009002714 (Year: 2009).*
Machine Translation for JP2010223861 (Year: 2010).*
Machine Translation for JP2012068199 (Year: 2012).*
Machine Translation for JP2012088188 (Year: 2012).*
Machine Translation for JP2013053910 (Year: 2013).*
Machine Translation for JP2013053977 (Year: 2013).*
Machine Translation for JP2013053978 (Year: 2013).*
Machine Translation for JP2013181904 (Year: 2013).*
Machine Translation for JP2014224722 (Year: 2014).*
Machine Translation for JP2017198605 (Year: 2017).*

* cited by examiner

CONTROL DEVICE FOR DYNAMOMETER SYSTEM

TECHNICAL FIELD

The present invention relates to a control device for a dynamometer system.

BACKGROUND ART

FIG. 5 is a diagram illustrating a configuration of a dynamometer system 100. The dynamometer system 100 includes: an engine E that serves as a test piece; a dynamometer D that serves as a power absorber; a connecting shaft S that connects the engine E and the dynamometer D; an engine control device 120 that controls the engine E through a throttle actuator 110; a dynamometer control device 140 that controls the dynamometer D through an inverter 130; an encoder 150 that detects rotation speed of an output shaft of the dynamometer D; and a shaft torque sensor 160 that detects shaft torque (torsional torque) of a connection portion between the connecting shaft S and the output shaft of the dynamometer D.

The engine control device 120 controls the output of the engine E according to a prescribed pattern for each test item; and the dynamometer control device 140 controls the rotation speed or torque of the dynamometer D, based on an output, etc. of the encoder 150 or the shaft torque sensor 160 (for example, see Patent Documents 1 and 2).

Patent Document 1: Japanese Unexamined Patent Application, Publication No. 2003-149085

Patent Document 2: Japanese Unexamined Patent Application, Publication No. 2014-224722

DISCLOSURE OF THE INVENTION

Problems to be Solved by the Invention

Meanwhile, with the dynamometer system 100 as described above, when the engine speed during engine start-up is controlled at a value corresponding to the engine speed during start-up of the engine unit alone, the dynamometer D needs to be controlled in an unloaded state as if the engine E is not connected to the connecting shaft S and the dynamometer D. Such control is required, for example, in a racing test for measuring the characteristics of an engine during revving. Such an unloaded state is realized by controlling the torsional torque of the connecting shaft S between the engine E and the dynamometer D at 0 [Nm].

FIG. 6 is a diagram illustrating change in rotation speed during engine start-up, in the case where an unloaded state is realized in the conventional system 100. More specifically, FIG. 6 is a diagram illustrating change in rotation speed during engine start-up, in the case where a shaft torque command value, which is input into the dynamometer control device 140, is set to zero (0) such that torsional torque would not occur in the conventional system 100. In FIG. 6, the thin solid line indicates a measurement result of the system 100, namely indicating the rotation speed measured by way of the encoder 150. Further, in FIG. 6, the bold dotted line indicates rotation speed measured in the unloaded state of the engine E while the engine E and bond shaft S are separated, namely indicating an ideal value while performing the unloaded control.

As illustrated in FIG. 6, if the conventional system 100 is merely controlled such that the shaft torque command value of the conventional system 100 is 0 [Nm], and the detection value of the shaft torque sensor is 0 [Nm], the engine E must bear the inertia of the connecting shaft S, in a portion closer to the engine E than to the shaft torque sensor 160; therefore, the engine speed during start-up will be lower than the ideal value corresponding to the unloaded state.

Note that, in theory, if the position of the shaft torque sensor 160 is set closer to the crank shaft of the engine E, the dynamometer D can bear the inertia of the connecting shaft S as well. However, if the shaft torque sensor 160 is closer to the engine E, heat of the engine E is more likely to be transmitted to the shaft torque sensor; therefore, change in the measured value caused by temperature drift will exert greater influence. Further, if the shaft torque sensor 160 is closer to the engine E, vibration of the engine E is more likely to be transmitted to the shaft torque sensor; therefore, the measurement accuracy will be reduced. For the above-described reasons, the position of the shaft torque sensor 160 is preferably closer to the dynamometer D than to the engine E, and the above-described problems are therefore critical.

Moreover, according to Patent Document 2, a shaft torque command value of a shaft torque control circuit is convoluted onto a value calculated by multiplying a quasi-differential value of angular velocity (corresponding to angular acceleration) of a dynamometer by a predetermined shaft inertia compensation value, thereby attempting to solve the above-described problems. However, according to the invention of Patent Document 2, an appropriate value of a cut-off frequency that characterizes the quasi-differentiation needs to be determined by trial and error, which takes effort. If the cut-off frequency is excessively lower than an appropriate value, responsiveness of the inertia compensation control may become lower; conversely, if the cut-off frequency is excessively higher, the control may become unstable.

An object of the invention is to provide, through a simple method, a control device for a dynamometer system that can accurately realize an unloaded state during start-up of a test piece.

Means for Solving the Problems (1) In order to achieve the above-mentioned object, the present invention provides a control device (e.g., dynamometer control device 6 to be described later) of a dynamometer system (e.g., dynamometer system 1 to be described later), which includes a dynamometer (e.g., dynamometer D to be described later), a test piece (e.g., engine E to be described later), a shaft (e.g., connecting shaft S to be described later) that connects the dynamometer and the test piece, a shaft torque sensor (e.g., shaft torque sensor 7 to be described later) that detects torque acting on the shaft, and a rotation speed detector (e.g., encoder 8 to be described later) that detects a rotation speed of the dynamometer. The control device includes: an integral operation amount calculation unit (e.g., integral operation amount calculation unit 611 to be described later) that calculates an integral value of a deviation between a detection value of the shaft torque sensor and a command value thereof, and calculates an integral operation amount by multiplying a sum of the integral value and a predetermined correction value by an integral gain (e.g., integral gain Ki to be described later); a correction value calculation unit (e.g., correction value calculation unit 612 to be described later) that calculates the correction value by multiplying a detection value of the rotation speed detector by a predetermined correction coefficient (e.g., inertia compensation amount Jcmp to be described later); a non-integral operation amount calculation unit (e.g., non-integral operation amount calculation unit 613 to be described later) that calculates a non-integral operation amount that is an output of a predetermined transfer function, into which the deviation is input; and a totaling unit (e.g., totaling unit 614 to be described later) that generates a torque current command signal for the dynamometer by totaling the integral operation amount and the non-integral operation amount. Here, a transfer function Ge0(s) of the non-integral operation amount calculation unit is defined such that the following formula (1) is satisfied, where Ki represents the integral gain, s represents a Laplacian operator, and Ge(s) represents a transfer function to output a torque current command signal that would cancel the deviation when the deviation is input.

$$Ge(s) = \frac{Ki}{s} + Ge0(s) \quad (1)$$

(2) In this case, the transfer function Ge(s) is preferably designed based on a control system design method which is referred to as μ synthesis or H∞design method.

Effects of the Invention (1) According to the present invention, the transfer function, which covers from the deviation between the detection value of the shaft torque sensor and the command value thereof (hereinafter simply referred to as "shaft torque deviation" as well) to the torque current command signal, is divided into the integral operation amount calculation unit and the non-integral operation amount calculation unit. In addition, the integral operation amount calculation unit calculates a sum of the integral value of the shaft torque deviation and a predetermined correction value, multiplies the sum by an integral gain, thereby calculating an integral operation amount. Here, according to the present invention, in particular, the integral value of the shaft torque deviation is convoluted onto the correction value calculated by multiplying the detection value of the rotation speed detector by a predetermined correction coefficient, whereby the inertia compensation control can be performed such that an apparent inertia of the test piece observed from the test piece side diminishes by an amount corresponding to the correction coefficient. Therefore, the load on the test piece can be reduced as compared to the conventional cases; therefore, the performance of the test piece alone can be evaluated with high accuracy in a racing test. Further, according to the present invention, as long as a transfer function Ge(s) having a shaft torque control function has been obtained by performing any type of a design method, such an inertia compensation control function can be added by simply dividing the transfer function Ge(s) into an integrator and a non-integrator such that the formula (1) is satisfied. In other words, the present invention does not require fine parameter adjustment, which has been required in the conventional art such as the one disclosed in Patent Document 2. Therefore, according to the present invention, an inertia compensation control function as described above can be added, through a simple method, to a known transfer function having a shaft torque control function.

(2) With a so-called robust control design method such as μ synthesis or H∞design method, which numerically derives a transfer function that would achieve a desired control objective, change in a design guideline is difficult to be reflected in a design result. Therefore, conventionally, when an inertia compensation control function as described above is attempted to be added, a transfer function needs to be derived by performing numerical calculation afresh in accordance with a prescribed procedure, which takes effort. In contrast, according to the present invention, once a transfer function Ge(s) is obtained as described above, an inertia compensation control function can be added, through a simple method, by separating the transfer function Ge(s), based on the formula (1) above.

PREFERRED MODE FOR CARRYING OUT THE INVENTION

Figure 1:
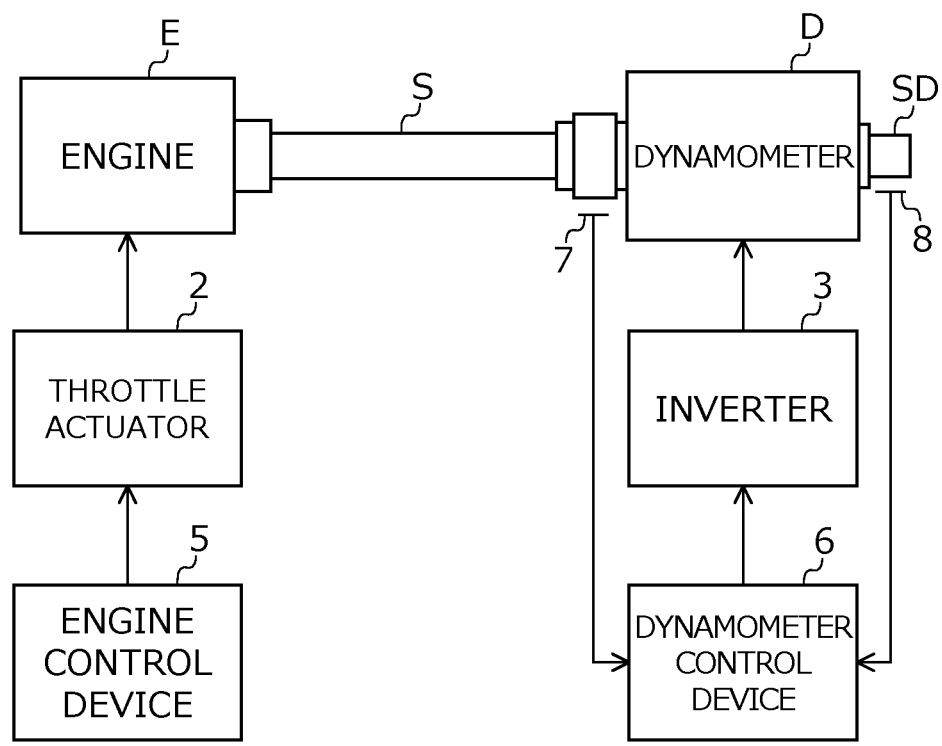
FIG. 1 is a diagram illustrating a configuration of a dynamometer system that uses a dynamometer control device according to an embodiment of the present invention.

Hereinafter, an embodiment of the present invention will be described in detail with reference to the drawings. FIG. 1 is a diagram illustrating a configuration of a dynamometer system 1 which uses a dynamometer control device 6 according to the present embodiment. The dynamometer system 1 includes: an engine E that serves as a test piece; a dynamometer D that is connected to the engine E through a connecting shaft S; an engine control device 5 that controls the engine E through a throttle actuator 2; an inverter 3 that supplies electric power to the dynamometer D; a dynamometer control device 6 that controls the dynamometer D through the inverter 3; a shaft torque sensor 7 that detects torsional torque of the connecting shaft S; and an encoder 8 that detects rotation speed of an output shaft SD of the dynamometer D.

Note that the connecting shaft S may be implemented by using mechanical components, such as a clutch, transmission and propeller shaft, which will be equipped on a vehicle together with the engine E, or by using a highly rigid test shaft that is prepared separately from these mechanical components for vehicle.

The shaft torque sensor 7 detects torsional torque acting on a portion which is closer to the dynamometer D than to the engine E, in relation to the connecting shaft S extending from the engine E to the dynamometer D, based on, for example, a strain amount in the twisting direction of the connecting shaft S, and transmits a signal, which is substantially proportional to the detection value, to the dynamometer control device 6.

The engine control device 5 starts the engine E at predetermined timing, and subsequently controls the output of the engine E in a predefined manner.

The dynamometer control device 6 generates a torque current command signal corresponding to a torque value to be generated by the dynamometer D, based on detection signals of the shaft torque sensor 7 and the encoder 8, such that the power generated by the engine E is absorbed in a predefined manner; and the dynamometer control device 6 inputs the torque current command signal into the inverter 3.

Figure 2:
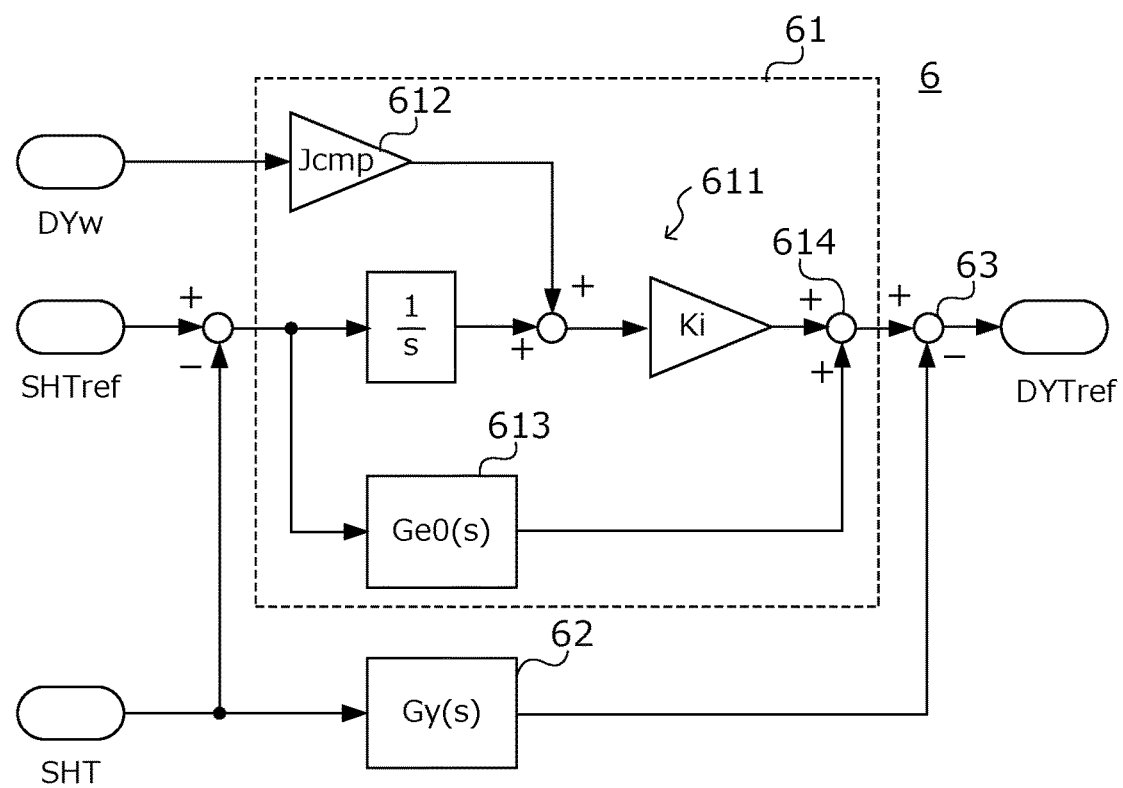
FIG. 2 is a block diagram illustrating a configuration of a control circuit for shaft torque control that is performed by way of the dynamometer control device according to the present embodiment.

FIG. 2 is a block diagram illustrating a configuration of a control circuit for shaft torque control which is performed by way of the dynamometer control device 6 according to the present embodiment.

Figure 3:
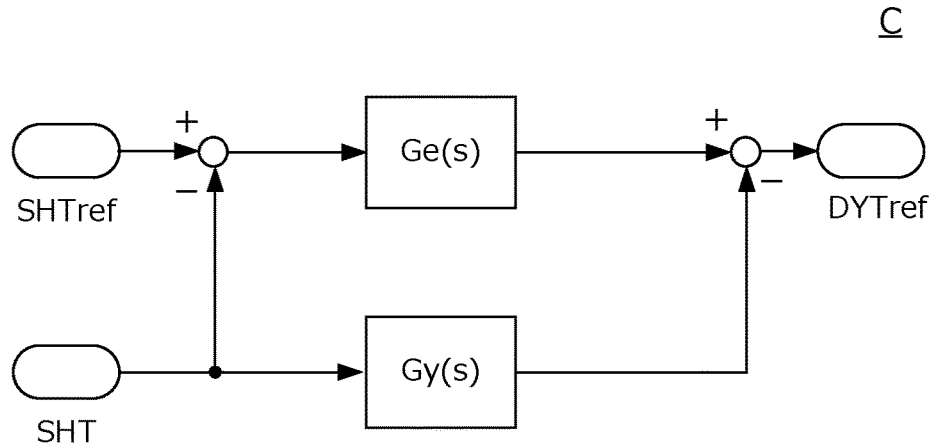
FIG. 3 is a block diagram illustrating a configuration of a controller including a shaft torque control function.
Figure 6:
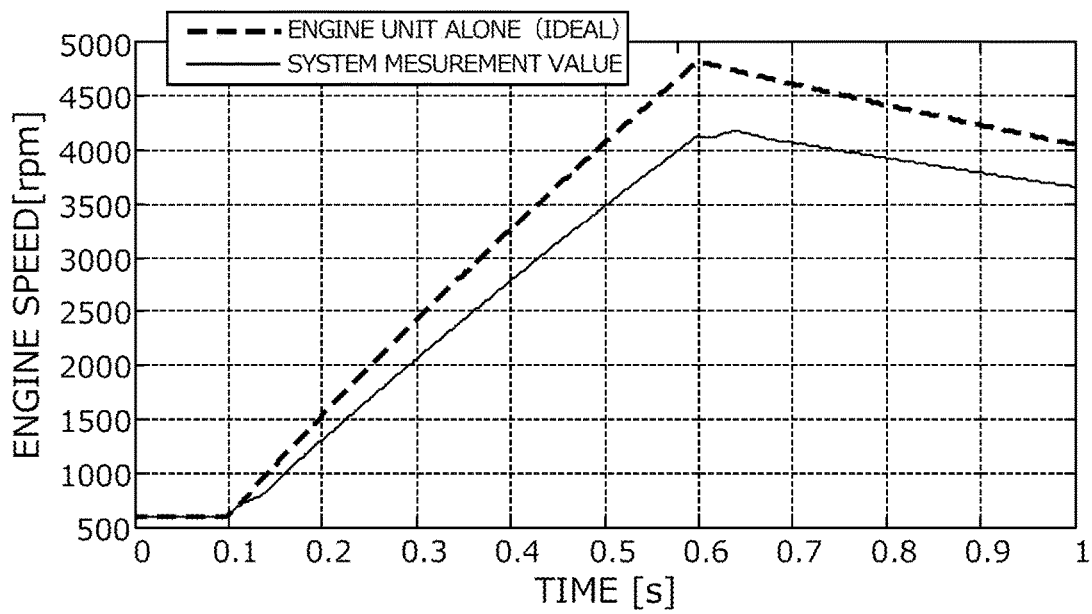
FIG. 6 is a graph illustrating a result of a racing test performed with the conventional dynamometer system.

FIG. 3 is a diagram illustrating a configuration of a controller C which serves as a basis of the dynamometer control device 6 of FIG. 2. The controller C of FIG. 3 includes a shaft torque control function such that when a detection value SHT of the shaft torque sensor and a command value SHTref thereof are input, the shaft torque control function generates a torque current command signal that would cancel the deviation thereof (SHTref-SHT, hereinafter simply referred to as "shaft torque deviation" as well). The dynamometer control device 6 according to the present embodiment illustrated in FIG. 2 is configured by adding an inertia compensation control function to the controller C having two (2) degrees of freedom illustrated in FIG. 3. The controller C having two (2) degrees of freedom including such a shaft torque control function, and transfer functions Ge(s) and Gy(s) composing this controller, are implemented by using, for example, a controller disclosed in an embodiment illustrated in FIG. 6 of Japanese Patent No. 3775284 filed by the Applicant of the present application. Note that a method for designing the controller C including the shaft torque control function, and the transfer functions Ge(s) and Gy(s) composing the controller, is not limited to, for example, a method based on μ synthesis disclosed in Japanese Patent No. 3775284. For example, other than the μ synthesis, a method designed based on another robust control design method such as H∞control may be used.

Referring back to FIG. 2, the dynamometer control device 6 includes: a first controller 61, into which a shaft torque deviation (SHTref-SHT) and a dynamometer rotation speed (i.e. a detection value DYw of the encoder) are input; a second controller 62, into which a detection value SHT of the shaft torque sensor is input; and a subtractor 63 that generates a torque current command signal DYTref by subtracting an output of the second controller 62 from an output of the first controller 61.

The second controller 62 includes a transfer function Gy(s), into which a detection value SHT of the shaft torque sensor is input. The transfer function Gy(s) is implemented by using the same function as the transfer function Gy(s) (refer to FIG. 3) composing the controller C having the above-described shaft torque control function.

The first controller 61 includes an integral operation amount calculation unit 611, a correction value calculation unit 612, a non-integral operation amount calculation unit 613, and a totaling unit 614.

The integral operation amount calculation unit 611 calculates an integral value of the shaft torque deviation (SHTref-SHT), calculates a sum of the integral value and a correction value calculated by way of the correction value calculation unit 612, and multiplies the sum by an integral gain Ki, thereby calculating an integral operation amount.

The correction value calculation unit 612 multiplies dynamometer rotation speed DYw by a predetermined inertia compensation amount Jcmp, thereby calculating a correction value (DYw×Jcmp) in relation to the above-described integral operation amount. As will be described later in detail, the dynamometer control device 6 is provided with an inertia compensation control function, with which an apparent inertia observed from the engine side diminishes by an inertia compensation amount Jcmp, by correcting an integral operation amount using such a correction value (DYw×Jcmp).

The non-integral operation amount calculation unit 613 includes a transfer function Ge0(s). The non-integral operation amount calculation unit 613 calculates a non-integral operation amount that is an output calculated by inputting the shaft torque deviation (SHTref-SHT) into the transfer function Ge0(s). The transfer function Ge0(s) of the non-integral operation amount calculation unit 613 is implemented by using a result calculated by separating an integrator of the integral gain Ki from the transfer function Ge(s) having the shaft torque control function such that the following formula (2) is satisfied. The transfer function Ge(s) is implemented, more specifically, by using the transfer function Ge(s) of the controller C having the shaft torque control function illustrated in FIG. 3, namely the transfer function Ge(s) that is derived together with the transfer function Gy(s) of the above-described second controller 62.

$$Ge(s) = \frac{Ki}{s} + Ge0(s) \qquad (2)$$

The totaling unit 614 totals an integral operation amount that is an output of the integral operation amount calculation unit 611, and a non-integral operation amount that is an output of the non-integral operation amount calculation unit 613. An output of the totaling unit 614 will be part of the torque current command signal DYTref as described above.

Next, the following describes that the dynamometer control device 6 configured as above (refer to FIG. 2) has an inertia compensation control function. Assuming, for simplicity, that the shaft for connecting the engine and the dynamometer is a rigid body (where the spring modulus Kc is ∞), an equation of motion of the control target is described with a two-inertial system model as represented by the following formulas (3-1) to (3-3).

$$EGJ \cdot s \cdot EGw = EGT + SHT \qquad (3\text{-}1)$$

$$SHT = \frac{Kc}{s} \cdot (DYw - EQw) \qquad (3\text{-}2)$$

$$DYJ \cdot s \cdot DYw = -SHT + DYT \qquad (3\text{-}3)$$

Further, adequacy of an operation of the inertia compensation control function will be revealed by analyzing the low-range characteristics thereof. Therefore, by extracting only a portion contributing to the low-range characteristics of the dynamometer control device 6 illustrated in FIG. 2, and further setting a command value SHTref to 0 (zero), the following formula (4) is obtained.

$$DYT = Ki \cdot \left(\frac{1}{s} \cdot (0 - SHT) + Jcmp \cdot DYw\right) \qquad (4)$$

When the formulas (3-1) to (3-3) and (4) are used, the ratio of the engine angular acceleration (s~EGw) in relation to the engine torque EGT (the transfer function covering from the engine torque to the angular acceleration) is represented by the following formula (5). Further, the low-range limit (s=0) of this transfer function will be a reciprocal of the apparent moment of inertia observed from the engine, and is 1/(EGJ−Jcmp) as calculated by the following formula (5). This clarifies that the apparent moment of inertia observed from the engine is from EGJ to EGJ−Jcmp, and is inertia-compensated by an inertia compensation amount Jcmp according to the dynamometer control device 6 of FIG. 2.

$$\frac{s \cdot EGw}{EGT} = \frac{Ki + s}{(EGJ - Jcmp) \cdot Ki + (EGJ + DYJ) \cdot s} \quad (5)$$

Figure 4:
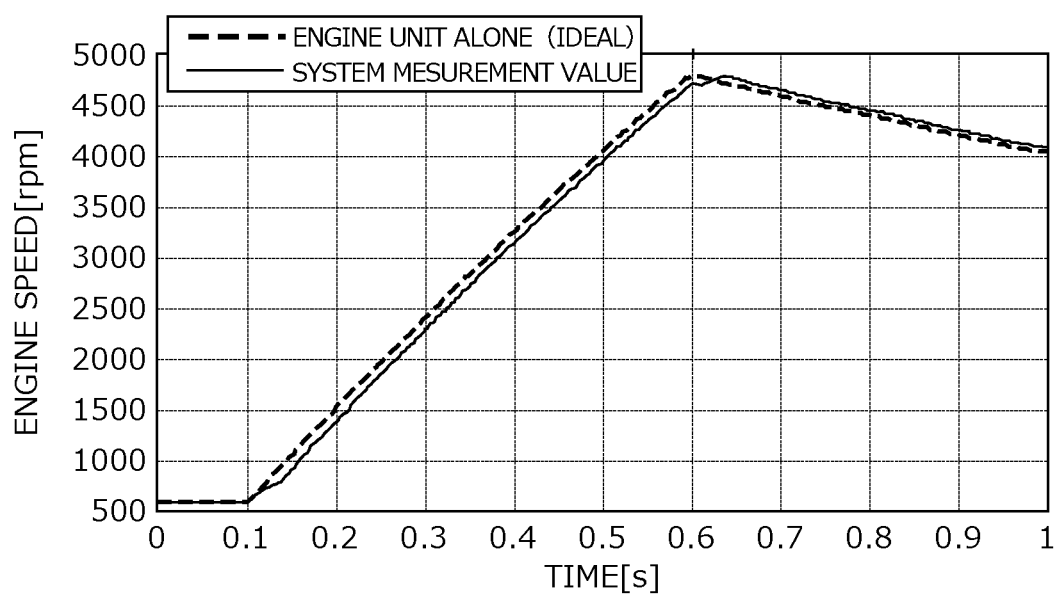
FIG. 4 is a graph illustrating a result of a racing test performed with the dynamometer system according to the above-described embodiment.
Figure 5:
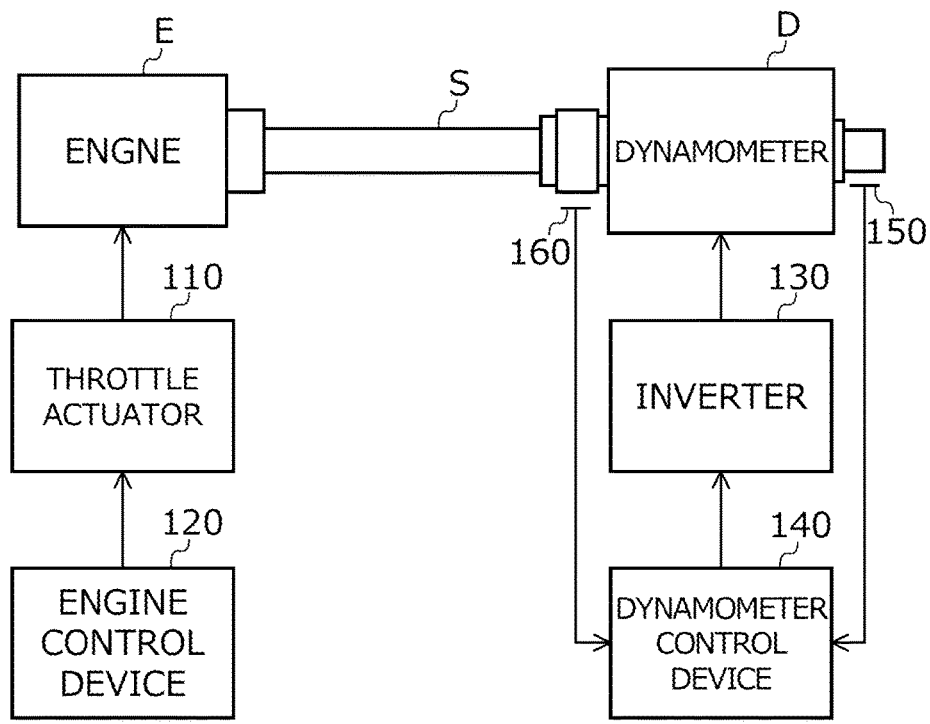
FIG. 5 is a diagram illustrating a configuration of a conventional dynamometer system.

Next, a description is provided for effects achieved by the dynamometer system 1 including the dynamometer control device 6 configured as described above. FIG. 4 is a diagram illustrating change in the engine speed during engine start-up, in the dynamometer system 1 using the dynamometer control device 6 of FIG. 2. In FIG. 4, the thin solid line indicates a measurement result of the system using the dynamometer control device 6 of FIG. 2. Further, the bold dotted line indicates a measurement result when the engine and the shaft are separated such that the engine is actually in an unloaded state, namely indicating an ideal value while performing the inertia compensation control. As illustrated in FIG. 4, the thin solid line and the bold dotted line substantially match each other. This verifies that, according to the system using the dynamometer control device 6 with the inertia compensation control function added as described above, since the shaft inertia of the dynamometer is compensated during engine start-up, a start-up waveform corresponding to the engine unit alone can be obtained. In other words, the unloaded state as observed from the engine can be realized by using the dynamometer control device 6 of the present embodiment.

EXPLANATION OF REFERENCE NUMERALS

1: dynamometer system
6: dynamometer control device
611: integral operation amount calculation unit
612: correction value calculation unit
613: non-integral operation amount calculation unit
614: totaling unit
7: shaft torque sensor
8: encoder 8 (rotation speed detector)
E: engine (test piece)
S: connecting shaft (shaft)

The invention claimed is:

1. A dynamometer system including a dynamometer, a shaft that connects the dynamometer and a test piece, a shaft torque sensor that detects torque acting on the shaft, a rotation speed detector that detects a rotation speed of the dynamometer, an inertia compensation control device that generates a torque current command signal by executing an inertia compensation control based on a detection value of the shaft torque sensor and a detection value of the rotation speed detector such that an apparent inertia of the test piece observed from the test piece side diminishes by an amount corresponding to a correction coefficient, and an inverter that supplies electric power to the dynamometer according to the torque, the inertia compensation control device comprising:

an integral operation amount calculation unit that calculates an integral value of a deviation between the detection value of the shaft torque sensor and a command value thereof, and calculates an integral operation amount by multiplying a sum of the integral value and a predetermined correction value by an integral gain;

a correction value calculation unit that calculates the correction value by multiplying the detection value of the rotation speed detector by the correction coefficient;

a non-integral operation amount calculation unit that calculates a non-integral operation amount that is an output of a predetermined transfer function, into which the deviation is input; and a totaling unit that generates a part of the torque current command signal by totaling the integral operation amount and the non-integral operation amount, wherein a transfer function Ge0(s), of the non-integral operation amount calculation unit, is defined by separating an integrator from a transfer function Ge(s), of a feedback controller that outputs a torque current command signal, so as to cancel the deviation when the deviation is input, so as to satisfy the following formula where Ki represents the integral gain of the integrator and s represents a Laplacian operator:

$$Ge(s) = \frac{Ki}{s} + Ge0(s).$$

2. The dynamometer system according to claim 1, wherein the transfer function Ge(s) is designed based on a control system design method that is referred to as μ synthesis or H∞ design method.

* * * * *